United States Patent Office 3,261,841
Patented July 19, 1966

3,261,841
N-SUBSTITUTED 1,5-IMINOCYCLOALKANES AND -ALKENES
Bernard L. Zenitz, Colonie, N.Y., assignor to Sterling Drug Inc., New York, N.Y., a corporation of Delaware
No Drawing. Filed May 3, 1961, Ser. No. 107,338
26 Claims. (Cl. 260—292)

This invention relates to new heterocyclic compounds, and in particular it is concerned with 1,5-iminocycloalkanes and 1,5-imino-2-cycloalkenes substituted on the nitrogen by a 3,3-disubstituted propyl radical or a 3,3-disubstituted 2-propenyl radical. It is also concerned with methods for the preparation of these compounds and with novel intermediates in their preparation.

The 1,5-iminocycloalkanes and 1,5-imino - 2 - cycloalkenes of the invention are preferably seven or eight membered rings, and thus are preferably derivatives of cycloheptane or cyclooctane (cycloheptene or cyclooctene). The cycloalkane ring is optionally substituted in the 3-position by a hydroxy group or carboxylic acyloxy group. The N-(3,3-disubstituted propyl) radical is also optionally substituted by a hydroxy group in the 3-position.

In a preferred aspect of the invention, the 1,5-iminocycloalkanes are represented in the free base form by the structural formula

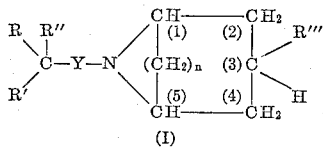

(I)

wherein R is monocarbocyclic aryl; R' is a member of the group consisting of monocarbocyclic aryl, cycloalkyl having from 5 to 6 ring members, lower-alkyl, monocarbocyclic aryl-lower-alkyl, thienyl, pyridyl, furyl and indolyl; R" is a member of the group consisting of hydrogen and hydroxy; R''' is a member of the group consisting of hydrogen, hydroxy, lower-alkoxy and carboxylic acyloxy; Y is an $\alpha,\beta$-lower-alkylene bridge; and $n$ is an integer from 2 to 3.

In another preferred aspect of the invention, the 1,5-imino-2-cycloalkenes are represented in the free base form by the formula

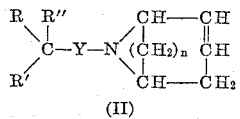

(II)

wherein R is monocarbocyclic aryl; R' is a member of the group consisting of monocarbocyclic aryl, cycloalkyl having from 5 to 6 ring members, lower-alkyl, monocarbocyclic aryl-lower-alkyl, thienyl, pyridyl, furyl and indolyl; R" is a member of the group consisting of hydrogen and hydroxy; Y is an $\alpha,\beta$-lower-alkylene bridge; and $n$ is an integer from 2 to 3.

In the above Formulas I and II, R is a monocarbocyclic aryl radical. It thus includes phenyl and phenyl substituted by one or more substituents inert under the conditions of the processes used to prepare the compounds. A preferred class of monocarbocyclic aryl radicals, because of their ready availability, includes phenyl and phenyl substituted by from one to three substituents selected from lower-alkyl (having from one to about five carbon atoms, for example, methyl, ethyl, propyl, isopropyl, butyl, amyl, and the like), lower-alkoxy (having from one to about five carbon atoms, for example, methoxy, ethoxy, propoxy, isopropoxy, butoxy, amyloxy, and the like), halogen (including fluorine, chlorine, bromine and iodine), hydroxy and nitro.

In the above Formulas I and II, R' is monocarbocyclic aryl, cycloalkyl having from 5 to 6 ring members, lower-alkyl, monocarbocyclic aryl-lower-alkyl, thienyl, pyridyl, furyl or indolyl. When R' is monocarbocyclic aryl it has the same meaning given above in defining R. When R' is cycloalkyl having from 5 to 6 ring members, it stands for cyclopentyl, cyclohexyl or lower-alkylated cyclopentyl or cyclohexyl. When R' is lower-alkyl it stands for an alkyl group, straight or branched, having from one to about eight carbon atoms, and thus can be a group such as methyl, ethyl, propyl, isopropyl, butyl, pentyl, hexyl, heptyl, octyl, and the like. When R' is monocarbocyclic aryl-lower-alkyl, it stands for a monocarbocyclic aryl group of the type described hereinabove attached through a lower-alkylene bridge of one to four carbon atoms to the remainder of the molecule, and thus can be a group such as benzyl, 2-phenylethyl, 3-phenylpropyl, 4-phenylbutyl, p-chlorobenzyl, m-methoxybenzyl, and the like. When R' is thienyl it stands for 2-thienyl or 3-thienyl. When R' is pyridyl it stands for 2-pyridyl, 3-pyridyl or 4-pyridyl. When R' is furyl it stands for 2-furyl or 3-furyl. When R' is indolyl it stands for 2-indolyl or 3-indolyl.

When R''' in Formula I stands for a carboxylic acyloxy group, the nature of the acyl group is not critical, provided it is of relatively low molecular weight, less than about 250. A preferred group of acyl radicals includes lower-alkanoyl, such as formyl, acetyl, propionyl butyryl, isobutyryl, valeryl, caproyl, and the like; carboxy-lower-alkanoyl, such as hemi-succinyl, hemi-glutaryl, hemi-adipyl, and the like; monocarbocyclic aroyl, such as benzoyl, p-toluyl, p-nitrobenzoyl, 3,4-dinitrobenzoyl, p-methoxybenzoyl, 3,4,5-trimethoxybenzoyl, and the like; monocarbocyclic aryl-lower-alkanoyl, such as phenylacetyl, 2-phenylpropionyl, 1-phenylpropionyl, p - nitrophenylacetyl, and the like; lower-alkenoyl, such as acryloyl, crotonoyl, and the like; monocarbocyclic aryl-lower-alkenoyl, such as cinnamoyl, p-nitrocinnamoyl, phenylcrotonoyl, and the like; and carbamyl, CONZZ', wherein Z and Z' are hydrogen or lower-alkyl groups, such as carbamyl, N-methylcarbamyl, N,N-dimethylcarbamyl, and the like.

When R''' in Formula I stands for a lower-alkoxy group, it embraces such radicals having from one to about six carbon atoms, including methoxy, ethoxy, propoxy, isopropoxy, butoxy, pentoxy, hexoxy, and the like.

In the above general Formulas I and II, Y is an $\alpha,\beta$-lower-alkylene bridge having from two to four carbon atoms, and as such stands for an ethylene radical, —$CH_2CH_2$—, wherein one or more of the hydrogen atoms can be replaced by lower-alkyl. The term "$\alpha,\beta$" distinguishes the lower-alkylene bridge from those wherein the free valence bonds are not on adjacent carbon atoms. Examples of $\alpha,\beta$-lower-alkylene bridges are —$CH_2CH_2$—,

—$CH(CH_3)CH_2$—, —$CH(CH_3)CH(CH_3)$—,

—$CH(C_2H_5)CH_2$—, —$CH_2C(CH_3)_2$—, and the like.

The compounds of Formulas I and II are prepared by either of the two following general methods:

(A) CONDENSATION OF A SUBSTITUTED PROPYL HALIDE WITH A 1,5-IMINOCYCLOALKANE OR 1,5-IMINO-2-CYCLOALKENE

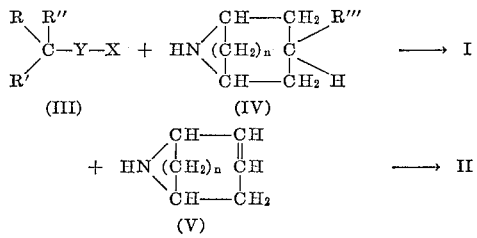

In the foregoing formulas, R, R', R'', R''', Y and n have the same meanings as given above, and X represents halogen, preferably chlorine or bromine. The reaction is carried out by heating the substituted propyl halide III with the 1,5-iminocycloalkane IV or 1,5-imino-2-cycloalkene V at a temperature between about 50° C and 150° C. in an inert solvent in the presence of an acid acceptor. The acid acceptor is a basic substance, such as an alkali metal carbonate or an excess of the starting base IV or V, which will react with the hydrogen halide produced in the reaction and drive the reaction to completion. In the case where R''' is hydroxy, ether formation is prevented or minimized by the use of an excess of starting base IV or V as the acid acceptor, or by protection of the hydroxy group by esterification.

The intermediate substituted propyl halide III can be prepared by reacting the appropriate β-halopropiophenone derivative, R—CO—Y—X, with a Grignard reagent, R'Mg-halide. There is thus produced a compound of Formula III where R'' is OH. The compounds of Formula III wherein R'' is H, that is, (R)(R')CH—Y—X, are prepared by treating the corresponding alcohols, (R)(R')CH—Y—OH, with thionyl chloride.

The compounds of Formula IV (R'''=H or OH) (nortropane, nortropine, pseudonortropine, granatanine, 3α- and 3β-granataninol), and Formula V (nortropidine and Δ²-granatenine) are known in the art.

(B) REACTION OF AN N(AROYLETHYL)-1,5-IMINOCYCLOALKANE OR -1,5-IMINO-2-CYCLOALKENE WITH A GRIGNARD REAGENT, R'Mg-HALIDE

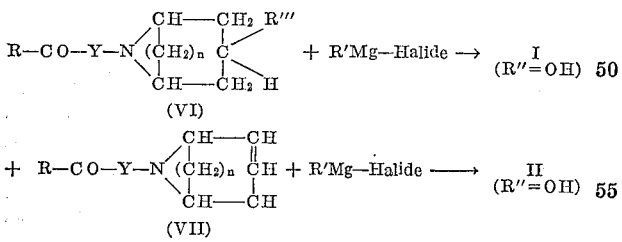

In the foregoing formulas, R, R', R''', Y and n have the same meanings as given above, except that R''' is limited in this instance to hydrogen, hydroxy or lower-alkoxy. In the case where R''' is hydroxy, the Grignard reagent will react with the hydroxy group to form an organometallic derivative; however, the hydroxy group is regenerated upon hydrolysis. The reaction takes place in an inert medium at ordinary temperatures. In the case where R' is pyridyl, it is preferred to replace the conventional Grignard reagent by pyridyllithium. It is, of course also possible to carry out the synthesis with the corresponding intermediates wherein R and R' are interchanged, that is, where R' is in the amino ketone and R in the Grignard reagent. This modification is preferred in the case where R' is furyl or indolyl.

The intermediates of Formulas VI and VII are also novel substances. They are prepared by either of the two following general methods:

(C) CONDENSATION OF AN AROYLETHYL HALIDE, R—CO—Y—X, WITH A 1,5-IMINOCYCLOALKANE (IV) OR 1,5-IMINO-2-CYCLOALKENE (V)

This procedure is analogous to method (A) described above for preparation of the final products.

(D) CONDENSATION OF ACETOPHENONE OR A SUBSTITUTED ACETOPHENONE, R—CO—CH₃, WITH FORMALDEHYDE AND A 1,5-IMINOCYCLOALKANE (IV) OR 1,5-IMINO-2-CYCLOALKENE (V)

The reaction takes place by heating approximately equimolar quantities of the reactants in an inert reaction medium at a temperature between about 50° C. and 150° C.

The products obtained by method (B) above are tertiary carbinols where R'' is OH. If it is desired to obtain compounds where R'' is H, they can be obtained by dehydration and hydrogenation as follows:

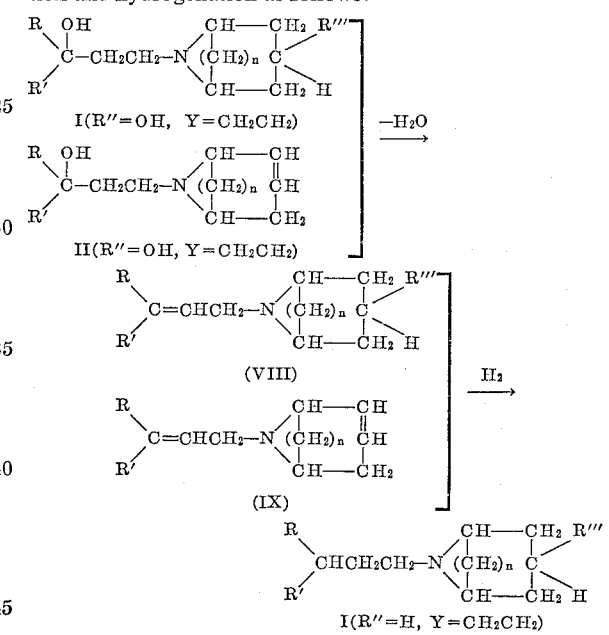

The tertiary carbinols I or II (R''=OH) can be dehydrated by contacting them with dehydrating agents known to dehydrate tertiary carbinols. The dehydrating agents are generally of an acidic nature and can be mineral acids, such as hydrochloric, sulfuric or phosphoric acid; organic acids, such as formic acid, acetic acid, oxalic acid or p-toluenesulfonic acid; salts such as potassium hydrogen sulfate or zinc chloride; or anhydrides, such as phosphorus pentoxide or acetic anhydride. Heat may be applied if desired to speed up the reaction, although in some cases the dehydration takes place readily at room temperature. In compounds of Formula I where both R'' and R''' are hydroxy groups, the dehydration can be effected selectively without affecting the hydroxy group in the tropane ring which, being a secondary hydroxy group and thus more stable, is less readily dehydrated than the hydroxy group in the side chain.

The reduction of the unsaturated derivatives VIII and IX is brought about by hydrogenation in the presence of a catalyst known to bring about saturation of olefinic double bonds, e.g., Raney nickel, palladium-on-carbon or platinum oxide. In the case of compounds of Formula IX, both double bonds are reduced. It follows, also, that compounds of Formula II can serve as intermediates for compounds for Formula I, the transformation being brought about by hydrogenating the double bond in the heterocyclic ring.

In the dehydration products VIII and IX, the position of the side chain double bond is known with certainty only in the cases where R' is monocarbocyclic aryl, thienyl, pyridyl, furyl or indolyl. In compounds of Formulas I and II (R''=OH), where R' is lower-alkyl, cycloalkyl or monocarbocyclic aryl-lower-alkyl, dehydration can take place in one of two directions, either with a hydrogen on an adjacent carbon in the ethylene bridge or with a hydrogen on an adjacent carbon in R', thus leading to one of two alternative structures or mixtures thereof. In the case where R' is monocarbocyclic aryl, thienyl, pyridyl, furyl or indolyl, dehydration involving the group R' is not possible and compounds of Formulas VIII and IX only can be produced. If compounds of Formula I where R'' is hydrogen are desired, the position of the double bond in the intermediate dehydration product is immaterial since the double bond is saturated in the hydrogenation step.

The compounds of this invention are the free bases having the Formulas I, II, VI, VII, VIII and IX, and the acid-addition and quaternary ammonium salt forms thereof. The acid-addition salts are prepared by causing the free base to react with a strong inorganic or organic acid, usually in an inert solvent or reaction medium. Examples of appropriate acids include hydrochloric, hydrobromic, sulfuric, phosphoric, citric, tartaric, quinic benzenesulfonic acid, and the like.

The quaternary ammonium salts of the compounds of the invention are prepared by causing a free base to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the free base and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions includes, for example, the chloride, bromide, iodide, sulfate or acid sulfate, methanesulfonate, benzenesulfonate, and the like. Salts having toxic anions are, however, useful in that they serve as characterizing derivatives of the free base and serve as intermediates for nontoxic quaternary salts by conventional ion exchange reactions. All acid-addition salts, regardless of the nature of the anions, are useful as intermediates in the purification of the free bases.

Pharmacological evaluation of the compounds of Formulas I, II, VIII and IX has indicated that they possess pharmacodynamic activity. In particular they possess antispasmodic activity such as anticholinergic and antitussive activity. Compounds of the invention also possess the ability to reverse the decrease in spontaneous activity in mice brought about by tremorine (1,4-dipyrrolidino-2-butyne).

The structure of the compounds was established by the methods of preparation and by the fact that the results of chemical analysis were in agreement with the expected structures.

The following examples will further illustrate the invention without the latter being limited thereby.

INTERMEDIATES (1) 1-R-1-R'-3-HALO-1-PROPANOLS (III)

*Preparation 1*

1-phenyl-1-cyclohexyl-3-chloro-1-propanol [III; R is $C_6H_5$, R' is $C_6H_{11}$, R'' is OH, Y is $CH_2CH_2$, X is Cl]:

Magnesium turnings (9.40 g., 0.385 mole) were treated with a crystal of iodine, and there was then added 20 ml. of anisole and 10 ml. of ether. Cyclohexyl bromide (63.00 g., 0.385 mole) was dissolved in 100 ml. of anisole, and 10 ml. of this solution was added to the magnesium suspension. The temperature was kept below 50° C. by means of an ice bath, and the balance of the cyclohexyl bromide solution was added dropwise. The mixture was heated at about 50° C. with stirring for one and one-half hours. The resulting Grignard reagent was cooled to 0° C., and 42.1 g. (0.25 mole) of β-chloropropiophenone in 120 ml. of benzene was added during one and one-half hours. The reaction mixture was stirred in an ice bath for seventy-five minutes and allowed to warm to 20° C. over a period of forty-five minutes. The mixture was then cooled in an ice-methanol bath, and 75 ml. of 6 N hydrochloric acid was added over a period of fifteen minutes. The organic layer was separated and washed twice with water, dried over anhydrous calcium sulfate and concentrated in vacuo. The residue was distilled through a 12" Vigreux column, and the fraction boiling at 130–140° C. (0.55–0.70 mm.) was collected. The latter mixture was redistilled, giving 1-phenyl-1-cyclohexyl-3-chloro - 1 - propanol, B.P. 135–136.5° C. (0.57 mm.), $n_D$=1.5425.

*Preparation 2*

1-(4-methoxyphenyl)-1-cyclohexyl - 3 - chloro-1-propanol [III; R is 4-$CH_3OC_6H_4$, R' is $C_6H_{11}$, R'' is OH, Y is $CH_2CH_2$, X is Cl] is produced by replacing the β-chloropropiophenone in Preparation 1 by a molar equivalent amount of β-chloro-4-methoxypropiophenone.

*Preparation 3*

1-(p-tolyl)-1-cyclohexyl-3-chloro-1-propanol [III; R is 4-$CH_3C_6H_4$, R' is $C_6H_{11}$, R'' is OH, Y is $CH_2CH_2$, X is Br] is produced by replacing the β-chloropropiophenone in Preparation 1 by a molar equivalent amount of β-chloro-4-methylpropiophenone.

*Preparation 4*

1-(4,5-diethyl - 2 - methoxyphenyl) - 1 - cyclohexyl-3-chloro-1-propanol [III; R is 2,4,5-($CH_3O$)($C_2H_5$)$_2C_6H_2$, R' is $C_6H_{11}$, R'' is OH, Y is $CH_2CH_2$, X is Cl] is produced by replacing the β-chloropropiophenone in Preparation 1 by a molar equivalent amount of β–chloro-4,5-diethyl-2-methoxypropiophenone.

*Preparation 5*

1-(2,5-dimethylphenyl) - 1 - cyclohexyl - 3 - chloro-1-propanol [III; R is 2,5-($CH_3$)$_2C_6H_3$, R' is $C_6H_{11}$, R'' is OH, Y is $CH_2CH_2$, X is Cl] is produced by replacing the β-chloropropiophenone in Preparation 1 by a molar equivalent amount of β-chloro - 2,5 - dimethylpropiophenone.

*Preparation 6*

1-(4-ethylphenyl)-1-cyclohexyl - 3 - chloro-1-propanol [III; R is 4-$C_2H_5C_6H_4$, R' is $C_6H_{11}$, R'' is OH, Y is $CH_2CH_2$, X is Cl] is produced by replacing the β-chloropropiophenone in Preparation 1 by a molar equivalent amount of β-chloro-4-ethylpropiophenone.

*Preparation 7*

1-(4-fluorophenyl) - 1 - cyclohexyl - 3 - chloro - 1-propanol [III; R is 4-$FC_6H_4$, R' is $C_6H_{11}$, R'' is OH, Y is $CH_2CH_2$, X is Cl] is produced by replacing the β-chloropropiophenone in Preparation 1 by a molar equivalent amount of β-chloro-4-fluoropropiophenone.

*Preparation 8*

1-(3-isoamoxy - 4 - methoxyphenyl) - 1 -cyclohexyl-3-bromo-1-propanol [III; R is 3,4-[($CH_3$)$_2CHCH_2CH_2O$]($CH_3O$)$C_6H_3$ R' is $C_6H_{11}$, R'' is OH, Y is $CH_2CH_2$, X is Br] is produced by replacing the β-chloropropiophenone in Preparation 1 by a molar equivalent amount of β-bromo-3-iso-amoxy-4-methoxypropiophenone.

Preparation 9

1-(4-chlorophenyl) - 1 - cyclohexyl - 3 - chloro-1-propanol [III; R is 4-ClC$_6$H$_4$, R' is C$_6$H$_{11}$, R" is OH, Y is CH$_2$CH$_2$, X is Cl] is produced by replacing the β-chloropropiophenone in Preparation 1 by a molar equivalent amount of β,4-dichloropropiophenone.

Preparation 10

1-(2,5-dimethylphenyl) - 1 - cyclohexyl - 3 - chloro-1-butanol [III; R is 2,5-(CH$_3$)$_2$C$_6$H$_3$, R' is C$_6$H$_{11}$, R" is OH, Y is CH$_2$CH(CH$_3$), X is Cl] is produced by replacing the β-chloropropiophenone in Preparation 1 by a molar equivalent amount of β-chloro-2,5-dimethylbutyrophenone.

Preparation 11

1-phenyl-1-cyclopentyl-3-chloro - 1 -propanol [III; R is C$_6$H$_5$, R' is C$_5$H$_9$, R" is OH, Y is CH$_2$CH$_2$, X is Cl] is produced by replacing the cyclohexyl bromide in Preparation 1 by a molar equivalent amount of cyclopentyl bromide.

Preparation 12

1-phenyl-1-(4-methylcyclohexyl) - 3 - chloro-1-propanol [III; R is C$_6$H$_5$, R' is 4-CH$_3$C$_6$H$_{10}$, R" is OH, Y is CH$_2$CH$_2$, X is Cl] is produced by replacing the cyclohexyl bromide in Preparation 1 by a molar equivalent amount of 4-methylcyclohexyl bromide.

Preparation 13

1,1-(diphenyl-3-chloro-1-propanol [III; R and R' are C$_6$H$_5$, R" is OH, Y is CH$_2$CH$_2$, X is Cl] is produced by replacing the cyclohexyl bromide is Preparation 1 by a molar equivalent amount of bromobenzene.

Preparation 14

1-phenyl-1-(4-methoxyphenyl) - 3 - chloro - 1 - propanol [III; R is C$_6$H$_5$, R' is 4-CH$_3$OC$_6$H$_4$, R" is OH, Y is CH$_2$CH$_2$, X is Cl] is produced by replacing the cyclohexyl bromide in Preparation 1 by a molar equivalent amount of p-methoxyphenyl bromide.

Preparation 15

1-phenyl-1-benzyl-3-chloro-1-propanol [III; R is C$_6$H$_5$, R' is C$_6$H$_5$CH$_2$, R" is OH, Y is CH$_2$CH$_2$, X is Cl] is produced by replacing the cyclohexyl bromide in Preparation 1 by a molar equivalent amount of benzyl bromide.

Preparation 16

1-phenyl-1-ethyl-3-chloro-1-propanol [III; R is C$_6$H$_5$, R' is C$_2$H$_5$, R" is OH, Y is CH$_2$CH$_2$, X is Cl] is produced by replacing the cyclohexyl bromide in Preparation 1 by a molar equivalent amount of ethyl bromide.

Preparation 17

1-phenyl-1-(n-hexyl)-3-chloro - 1 - propanol [III; R is C$_6$H$_5$, R' is C$_6$H$_{13}$, R" is OH, Y is CH$_2$CH$_2$, X is Cl] is produced by replacing the cyclohexyl promide in Preparation 1 by a molar equivalent amount of n-hexyl bromide.

Preparation 18

1-phenyl-1-(2-thienyl) - 3 - chloro-1-propanol [III; R is C$_6$H$_5$, R' is (2)-C$_4$H$_3$S, R" is OH, Y is CH$_2$CH$_2$, X is Cl] is produced by replacing the cyclohexyl bromide in Preparation 1 by a molar equivalent amount of 2-thienyl bromide.

Preparation 19

1-phenyl-1-(2-pyridyl)-3-chloro - 1 - propanol [III; R is C$_6$H$_5$, R' is (2)-C$_5$H$_4$N, R" is OH, Y is CH$_2$CH$_2$, X is Cl] is produced by replacing the cyclohexylmagnesium bromide in Preparation 1 by a molar equivalent amount of 2-pyridyllithium.

(2) N-(2-BENZOYLETHYL)-1,5-IMINOCYCLOALKANES OR -2-CYCLOALKENES (VI AND VII)

Preparation 20

8-(2-benzoylethyl)nortropidine [VII; R is C$_6$H$_5$, Y is CH$_2$CH$_2$, n is 2]: Nortropidine (21.84 g.) and 16.87 g. of β-chloropropiophenone were each separately dissolved in 100 ml. of benzene. The two solutions were cooled below 10° C. and then combined, holding the temperature below 20° C. The mixture was then allowed to warm to room temperature and kept overnight. The precipitate of nortropidine hydrochloride was removed by filtration and washed with ether. The combined filtrate and ether washings were washed with water and dried over anhydrous calcium sulfate. To the dried solution was added an excess of ethereal hydrogen chloride which caused precipitation of 25.35 g. of 8-(2-benzoylethyl)nortropidine in the form of its hydrochloride salt. The latter was recrystallized from acetone to give a sample having the M.P. 151.2–152.6° C. (corr.).

Preparation 21

8-(2-benzoylethyl)nortropine [VI; R is C$_6$H$_5$, R''' is OH, Y is CH$_2$CH$_2$, n is 2]: Nortropine (50.8 g.) was dissolved in 2 liters of boiling benzene. A solution of 33.9 g. of β-chloropropiophenone in 200 ml. of benzene was added to the first solution in a slow stream. The reaction mixture was cooled slowly to room temperature with occasional stirring, then cooled in ice and filtered. The filtrate was concentrated in vacuo to a volume of 200 ml. and filtered while hot. Upon cooling the solution there separated 43.6 g. of 8-(2-benzoylethyl)nortropine, M.P. 102–103° C. (uncorr.), when recrystallized from ethyl acetate.

Preparation 22

9-(2-benzoylethyl)granatanine [VII; R is C$_6$H$_5$, Y is CH$_2$CH$_2$, n is 3] is produced by replacing the nortropidine in Preparation 20 by a molar equivalent amount of granatanine.

Preparation 23

8-[2-(4-methoxybenzoyl)ethyl]nortropidine [VII; R is 4-CH$_3$OC$_6$H$_4$, Y is CH$_2$CH$_2$, n is 2] is produced by replacing the β-chloropropiophenone in Preparation 20 by a molar equivalent amount of β-chloro-4-methoxypropiophenone.

Preparation 24

8-[2-(4-methylbenzoyl)ethyl]nortropidine [VII; R is 4-CH$_3$C$_6$H$_4$, Y is CH$_2$CH$_2$, n is 2] is produced by replacing the β-chloropropiophenone in Preparation 20 by a molar equivalent amount of β-bromo-4-methylpropiophenone.

Preparation 25

8-[2-(4-fluorobenzoyl)ethyl]nortropidine [VII; R is 4-FC$_6$H$_4$, Y is CH$_2$CH$_2$, n is 2] is produced by replacing the β-chloropropiophenone in Preparation 20 by a molar equivalent amount of β-chloro-4-fluoropropiophenone.

Preparation 26

8-[2-(3,5-dimethylbenzoyl)-1-methylethyl]nortropidine [VII; R is 3,5-(CH$_3$)$_2$C$_6$H$_3$, Y is CH$_2$CH(CH$_3$), n is 2] is produced by replacing the β-chloropropiophenone in Preparation 20 by a molar equivalent amount of β-chloro-3,5-dimethylbutyrophenone.

Preparation 27

8-[2-(3-bromobenzoyl)ethyl]nortropidine [VII; R is 3-BrC$_6$H$_4$, Y is CH$_2$CH$_2$, n is 2]: A mixture of 14.55 g. (0.10 mole) of nortropidine hydrochloride, 19.90 g. (0.10 mole) of 3-bromoacetophenone, 4.5 g. of paraformaldehyde, 3 drops of concentrated hydrochloric acid and 30 ml. of absolute ethanol was refluxed for one and one-half hours. There was then added an additional 3.0 g. of paraformaldehyde and the mixture was refluxed overnight. The reaction mixture was concentrated in vacuo, and the residue dissolved in water and acidified with 3 ml.

of hydrochloric acid. The latter mixture was extracted with benzene, and the aqueous layer was separated and made basic with excess ammonium hydroxide. The alkaline mixture was extracted three times with benzene, and the extracts were washed with water and dried over anhydrous calcium sulfate. To the dried ether solution was added an excess of hydrogen chloride in ether and the solution was concentrated to a small volume, whereupon there separated 25.8 g. of 8-[2-(3-bromobenzoyl)ethyl]nortropidine in the form of its hydrochloride salt which when recrystallized from an ethanol-ether mixture had the M.P. 178.6–179.6° C. (corr.).

*Preparation 28*

8-[2-(4-chlorobenzoyl)ethyl]nortropidine [VII; R is 4-$ClC_6H_4$, Y is $CH_2CH_2$, $n$ is 2] was prepared from nortropidine hydrochloride, 4-chloroacetophenone and paraformaldehyde, and obtained in the form of its hydrochloride salt, M.P. 168.6–170.8° C. (corr.), when recrystallized from an isopropyl alcohol-ether mixture.

*Preparation 29*

8-[2-(4-methoxybenzoyl)ethyl]nortropidine [VII; R is 4-$CH_3OC_6H_4$, Y is $CH_2CH_2$, $n$ is 2] was prepared from 4-methoxyacetophenone, nortropidine hydrochloride and paraformaldehyde, and obtained in the form of its hydrochloride salt, M.P. 162.8–163.6° C. (corr.), when recrystallized from acetone.

*Preparation 30*

8-[2-(3,4-dichlorobenzoyl)ethyl]nortropidine [VII; R is 3,4-$Cl_2C_6H_3$, Y is $CH_2CH_2$, $n$ is 2] was prepared from 3,4-dichloroacetophenone, nortropidine hydrochloride and paraformaldehyde, and obtained in the form of its hydrochloride salt, M.P. 195–196.8° C. (corr.), when recrystallized from an ethanol-ether mixture.

*Preparation 31*

8-[2-(3-nitrobenzoyl)ethyl]nortropidine [VII; R is 3-$(O_2N)C_6H_4$, Y is $CH_2CH_2$, $n$ is 2] was prepared from 3-nitroacetophenone, paraformaldehyde and nortropidine hydrochloride, and obtained in the form of its hydrochloride salt, M.P. 178.6–179.2° C. (corr.), when recrystallized from an isopropyl alcohol-ether mixture.

*Preparation 32*

8-(2-benzoylethyl)nortropane [VI; R is $C_6H_5$, Y is $CH_2CH_2$, R''' is H, $n$ is 2] was prepared from nortropane hydrochloride, acetophenone and paraformaldehyde, and obtained in the form of its hydrochloride salt, M.P. 179.0–180.6° C. (corr.), when recrystallized from acetone and from acetonitrile.

*Preparation 33*

8-[2-(4-methoxybenzoyl)ethyl]nortropane [VI; R is 4-$CH_3OC_6H_4$, Y is $CH_2CH_2$, R''' is H, $n$ is 2] was prepared from 4-methoxyacetophenone, nortropane hydrochloride and paraformaldehyde, and obtained in the form of its hydrochloride salt, M.P. 161–167° C. (uncorr.), which was converted to the free base, M.P. 58.5–60° C. (uncorr.) (recrystallized from hexane).

*Preparation 34*

8-[2-(3-bromobenzoyl)ethyl]nortropane [VI; R is 3-$BrC_6H_4$, Y is $CH_2CH_2$, R''' is H, $n$ is 2] is produced by replacing the nortropidine hydrochloride in Preparation 27 by a molar equivalent amount of nortropane hydrochloride.

*Preparation 35*

9-[2-(3-bromobenzoyl)ethyl]granatanine [VI; R is 3-$BrC_6H_4$, Y is $CH_2CH_2$, R''' is H, $n$ is 3] is produced by replacing the nortropidine hydrochloride in Preparation 27 by a molar equivalent amount of granatanine hydrochloride.

*Preparation 36*

9-[2-(3-bromobenzyl)ethyl] - 3β - hydroxygranatanine [VI; R is 3-$BrC_6H_4$, Y is $CH_2CH_2$, R''' is OH, $n$ is 3] is produced by replacing the nortropidine hydrochloride in Preparation 27 by a molar equivalent amount of 3β-hydroxygranatanine.

*Preparation 37*

9-[2-(3-bromobenzoyl)ethyl]-$\Delta^2$-granatenine [VII; R is 3-$BrC_6H_4$, Y is $CH_2CH_2$, $n$ is 3] is produced by replacing the nortropidine hydrochloride in Preparation 27 by a molar equivalent amount of $\Delta^2$-granatenine hydrochloride.

*Preparation 38*

8-[2-(4-methylbenzoyl)ethyl]nortropidine [VII; R is 4-$CH_3C_6H_4$, Y is $CH_2CH_2$, $n$ is 2] is produced by replacing the 3-bromoacetophenone in Preparation 27 by a molar equivalent amount of 4-methylacetophenone.

*Preparation 39*

8 - [2 - (3 - bromo-4-chlorobenzoyl)ethyl]nortropidine [VII; R is 3,4-$BrClC_6H_3$, Y is $CH_2CH_2$, $n$ is 2] is produced by replacing the 3-bromoacetophenone in Preparation 27 by a molar equivalent amount of 3-bromo-4-chloroacetophenone.

*Preparation 40*

2 - [2 - (2-bromo-3,4-dimethoxybenzoyl)ethyl]nortropidine [VII; R is 2,3,4-$Br(CH_3O)_2C_6H_2$, Y is $CH_2CH_2$, $n$ is 2] is produced by replacing the 3-bromoacetophenone in Preparation 27 by a molar equivalent amount of 2-bromo-3,4-dimethoxyacetophenone.

*Preparation 41*

8 - [2 - (4 - secondary-butylbenzoyl)ethyl]nortropidine [VII; R is 4-[$CH_3CH_2CH(CH_3)$]$C_6H_4$, Y is $CH_2CH_2$, $n$ is 2] is produced by replacing the 3-bromoacetophenone in Preparation 27 by a molar equivalent amount of 4-secondary-butylacetophenone.

*Preparation 42*

8 - [2 - (4 - n-hexylbenzoyl)ethyl]nortropidine [VII; R is 4-$(C_6H_{13})C_6H_4$, Y is $CH_2CH_2$, $n$ is 2] is produced by replacing the 3-bromoacetophenone in Preparation 27 by a molar equivalent amount of 4-n-hexylacetophenone.

*Preparation 43*

8 - [2 - (2,4,6 - trimethylbenzoyl)ethyl]nortropidine [VII; R is 2,4,6-$(CH_3)_3C_6H_2$, Y is $CH_2CH_2$, $n$ is 2] is produced by replacing the 3-bromoacetophenone in Preparation 27 by a molar equivalent amount of 2,4,6-trimethylacetophenone.

*Preparation 44*

8 - [2 - (2,4,6 - trimethoxybenzoyl)ethyl]nortropidine [VII; R is 2,4,6-$(CH_3O)_3C_6H_2$, Y is $CH_2CH_2$, $n$ is 2] is produced by replacing the 3-bromoacetophenone in Preparation 27 by a molar equivalent amount of 2,4,6-trimethoxyacetophenone.

*Preparation 45*

8 - [2 - (2 - chlorobenzoyl)ethyl]nortropidine [VII; R is 2-$ClC_6H_4$, Y is $CH_2CH_2$, $n$ is 2] was prepared from 2-chloroacetophenone, nortropidine hydrochloride and paraformaldehyde, and obtained in the form of its hydrochloride salt, M.P. 159.5–161° C. (uncorr.) when recrystallized from acetone.

*Preparation 46*

8-[2-(2-chlorobenzoyl)ethyl]nortropane [VI; R is 2-$ClC_6H_4$, R''' is H, Y is $CH_2CH_2$, $n$ is 2] was prepared from 2-chloroacetophenone, nortropane hydrochloride and paraformaldehyde, and obtained in the form of its hydrochloride salt, M.P. 171.8–172.6° C. (corr.).

8[-(2-furoyl)ethyl]nortropane [VI; R is (2)-($C_4H_3O$), R''' is H, Y is $CH_2CH_2$, $n$ is 2] and 8-[3-(3-indolyl)-3-oxopropyl]nortropane [VI; R is (3)-indolyl, R''' is H, Y is $CH_2CH_2$, $n$ is 2] can be prepared from 2-acetylfuran and 3-acetylindole, respectively, nortropane hydrochloride and paraformaldehyde.

EXAMPLE 1

8 - (3 - cyclohexyl - 3 - phenyl-3-hydroxypropyl)-3α-hydroxynortropane [I; R is $C_6H_5$, R' is $C_6H_{11}$, R'' is OH, R''' is OH(α), Y is $CH_2CH_2$, $n$ is 2]: A mixture of 6.30 g. (0.025 mole) of 1-phenyl-1-cyclohexyl-3-chloro-1-propanol (Preparation 1), 6.4 g. (0.050 mole) of nortropine and 125 ml. of dry benzene was refluxed for twenty-six hours. The reaction mixture was filtered to remove the insoluble nortropine hydrochloride, and the filtrate was washed five times with water, then with 1 N hydrochloric acid and again three times with water. The acidic aqueous extracts were combined and extracted with ether, and then made basic with excess ammonium hydroxide. The alkaline solution was extracted four times with methylene dichloride and the extracts were dried over anhydrous calcium sulfate and concentrated. The residue (4.52 g., M.P. 166–171° C.) was recrystallized three times from ethyl acetate and dried for twenty-four hours at 56° C. in vacuo to give 8-(3-cyclohexyl-3-phenyl-3-hydroxypropyl) - 3α - hydroxynortropane, M.P. 172.0–173.0° C. (corr.)

The methiodide salt of 8-(3-cyclohexyl-3-phenyl-3-hydroxypropyl) - 3α - hydroxynortropane, M.P. 245.0–247.0° C. (corr.), was obtained by refluxing 0.58 g. of the tertiary base with 1.0 g. of methyl iodide in 20 ml. of acetone for sixteen hours, concentrating the mixture to dryness and recrystallizing the residue several times from acetone.

EXAMPLE 2

8 - (3 - phenyl - 3 - cyclohexyl-3-hydroxypropyl)-3β-hydroxynortropane [I; R is $C_6H_5$, R' is $C_6H_{11}$, R'' is OH, R''' is OH(β), Y is $CH_2CH_2$, $n$ is 2]: A mixture of 5 g. of 1-phenyl-1-cyclohexyl-3-chloro-1-propanol, 5.6 g. of pseudonortropine and 100 ml. of acetonitrile was refluxed for twenty-eight hours. The reaction mixture was diluted with 100 ml. of anhydrous ether, and the mixture filtered to remove 3.6 g. of pseudonortropine hydrochloride. The filtrate was washed with water until neutral and extracted twice with 100 ml. of dilute ethanesulfonic acid solution and finally with water. The acid aqueous extracts were filtered and made basic with aqueous sodium carbonate solution. A gum separated which was dissolved in ether and the solution filtered and concentrated. The residue was dissolved in 200 ml. of dry acetone and acidified with ethereal hydrogen chloride. The solution was diluted with ether which caused the separation of the product, and the latter was recrystallized from 800 ml. of ethyl methyl ketone and dried at 100° C. (0.2 mm.) over phosphorus pentoxide for five hours to give 3 g. of 8 - (3 - phenyl - 3 - cyclohexyl-3-hydroxypropyl)-3β-hydroxynortropane in the form of its hydrochloride salt, M.P. 216.2–218.8° C. (corr.)

The methiodide salt of 8-(3-phenyl-3-cyclohexyl-3-hydroxypropyl)-3β-hydroxynortropane had the M.P. 218.2–221.8° C. (corr.).

EXAMPLE 3

9 - (3 - cyclohexyl - 3 - phenyl - 3 - hydroxypropyl)-3β-hydroxygranatanine [I; R is $C_6H_5$, R' is $C_6H_{11}$, R'' is OH, R''' is OH(β), Y is $CH_2CH_2$, $n$ is 3] was prepared from 1-phenyl-1-cyclohexyl-3-chloro-1-propanol and 3β-hydroxygranatanine, and obtained in the form of its hydrochloride salt, M.P. 274.6–275.2° C. (dec.) (corr.), after several recrystallizations from methanol.

The methiodide salt of 9-(3-cyclohexyl-3-phenyl-3-hydroxypropyl)-3β-hydroxygranatanine had the M.P. 208.4–211.8° C. (corr.).

EXAMPLE 4

9 - (3 - cyclohexyl - 3 - phenyl - 3 - hydroxypropyl)-3α-hydroxygranatanine [I; R is $C_6H_5$, R' is $C_6H_{11}$, R'' is OH, R''' is OH(α), Y is $CH_2CH_2$, $n$ is 3] was prepared from 1-phenyl-1-cyclohexyl-3-chloro-1-propanol and 3α-hydroxygranatanine, and had the M.P. 113–114.5° C. (uncorr.). A hexane solution of the free base was converted to the hydrochloride salt form with ethereal hydrogen chloride, and it had the M.P. 183.0–185.4° C. (corr.), when recrystallized from an isopropyl alcohol-ethanol mixture.

The methiodide salt of 9-(3-cyclohexyl-3-phenyl-3-hydroxypropyl)-3α-hydroxygranatanine had the M.P. 228.8–231.2° C. (corr.).

EXAMPLE 5

8 - (3 - cyclohexyl - 3 - phenyl - 3 - hydroxypropyl)-nortropane [I; R is $C_6H_5$, R' is $C_6H_{11}$, R'' is OH, R''' is H, Y is $CH_2CH_2$, $n$ is 2] was prepared from 1-phenyl-1-cyclohexyl-3-chloro-1-propanol and nortropane, and obtained in the form of its hydrochloride salt, M.P. 272.2–273.0° C. (corr.), when recrystallized first from methyl ethyl ketone and then from an isopropyl alcohol-ether mixture.

8 - (3 - cyclohexyl - 3 - phenyl - 3 - hydroxypropyl)-nortropane in the form of its hydrochloride salt, when tested for mydriasis in the mouse by the method described by Long et al., J. Pharmacol. Exptl. Therap. 17, 29 (1956), had an $ED_{50}$ value of 6.5 mg./kg.; and when measured for its ability to reverse the decrease in spontaneous motility in mice produced by 10 mg./kg. of tremorine, the compound was found to have a normalizing dose (ND) of 3.7 mg./kg. The intravenous toxicity of 8-(3-cyclohexyl-3-phenyl-3-hydroxypropyl)nortropane in the mouse was determined and an $LD_{50}$ value of 22±1.4 mg./kg. in terms of the free base was found.

The methiodide salt of 8-(3-cyclohexyl-3-phenyl-3-hydroxypropyl)nortropane had the M.P. 229.5–231.5° C. (uncorr.).

Concentrated hydrochloric acid (4.0 ml.) was added to a solution of 5.1 g. of silver nitrate in 100 ml. of water. The precipitated silver chloride was filtered, washed with water and with methanol and added to a solution of 4.69 g. of the methiodide salt of 8-(3-cyclohexyl-3-phenyl-3-hydroxypropyl)nortropane in aqueous methanol. The mixture was stirred overnight in the dark and then filtered and concentrated in vacuo. The residue was recrystallized first from an ethanol-ether mixture and then from a methanol-ether mixture to give 8-(3-cyclohexyl-3-phenyl-3-hydroxypropyl)nortropane in the form of its methochloride salt, M.P. 263.8–265.3° C. (dec.) (corr.).

8 - (3 - cyclohexyl - 3 - phenyl - 3 - hydroxypropyl)-nortropane methochloride was found to have a mydriatic $ED_{50}$ value of 0.6 mg./kg.

EXAMPLE 6

9 - (3 - phenyl - 3 - cyclohexyl - 3 - hydroxypropyl)-granatanine [I; R is $C_6H_5$, R' is $C_6H_{11}$, R'' is OH, R''' is H, Y is $CH_2CH_2$, $n$ is 3] was prepared from 1-phenyl-1-cyclohexyl-3-chloro-1-propanol and granatanine, and obtained in the form of its hydrochloride salt, M.P. 290° C. (corr.), when recrystallized first from an isopropyl alcohol-ethanol-acetone mixture and then from an ethanol-acetone mixture.

EXAMPLE 7

8 - (3 - cyclohexyl - 3 - phenyl - 3 - hydroxypropyl)-nortropidine [II; R is $C_6H_5$, R' is $C_6H_{11}$, R'' is OH, Y is $CH_2CH_2$, $n$ is 2] was prepared from 1-phenyl-1-cyclohexyl-3-chloro-1-propanol and nortropidine, and obtained in the form of its hydrochloride salt, M.P. 265.4–266.4° C. (corr.), when recrystallized from methyl ethyl ketone and then from an isopropyl alcohol-ether mixture.

8 - (3 - cyclohexyl - 3 - phenyl - 3 - hydroxypropyl)-nortropidine in the form of its hydrochloride salt was found to have a mydriatic $ED_{50}$ value of 3.3 mg./kg., and a tremorine normalizing dose of 6.1 mg./kg.

EXAMPLE 8

9 - (3 - phenyl - 3 - cyclohexyl - 3 - hydroxypropyl)-$\Delta^2$-granatenine [II; R is $C_6H_5$, R' is $C_6H_{11}$, R" is OH, Y is $CH_2CH_2$, $n$ is 3] was prepared from 1-phenyl-1-cyclohexyl-3-chloro-1-propanol and $\Delta^2$-granatenine, and obtained in the form of its hydrochloride salt, M.P. 286–287° C. (dec.) (uncorr.), when recrystallized from an ethanol-acetone mixture. A portion of the hydrochloride salt was converted to the free base and the latter was dissolved in hexane, diluted with anhydrous ether and treated with a solution of methanesulfonic acid in acetone. The resulting gum was crystallized by dilution with ether and recrystallized four times from an acetone-ether mixture to give 9-(3-phenyl - 3 - cyclohexyl-3-hydroxypropyl)-$\Delta^2$-granatenine in the form of its methanesulfonate salt, M.P. 193.0–194.8° C. (corr.).

EXAMPLE 9

8 - [3 - cyclohexyl - 3 - (4 - methoxyphenyl) - 3 - hydroxypropyl]nortropane [I; R is $4-CH_3OC_6H_4$, R' is $C_6H_{11}$, R" is OH, R''' is H, Y is $CH_2CH_2$, $n$ is 2] is produced by causing 1-(4-methoxyphenyl)-1-cyclohexyl-3-chloro-1-propanol (Preparation 2) to react with nortropane according to the manipulative procedure described above in Example 2.

EXAMPLE 10

8 - [3 - cyclohexyl - 3 - (p-tolyl) - 3 - hydroxypropyl]-3$\alpha$-acetoxynortropane [I; R is $4-CH_3C_6H_4$, R' is $C_6H_{11}$, R" is OH, R''' is $OCOCH_3$, Y is $CH_2CH_2$, $n$ is 2] is produced by causing 1-(p-tolyl)-1-cyclohexyl-3-chloro-1-propanol (Preparation 3) to react with nortropine acetate.

EXAMPLE 11

8 - [3 - cyclohexyl - 3 - (4,5 - diethyl - 2 - methoxyphenyl) - 3 - hydroxypropyl] - 3$\alpha$ - ($\beta$ - carboxypropionoxy)nortropane [I; R is $2,4,5-(CH_3O)(C_2H_5)_2C_6H_2$, R' is $C_6H_{11}$, R" is OH, R''' is $OCOCH_2CH_2COOH$, Y is $CH_2CH_2$, $n$ is 2] is produced by causing 1-(4,5-diethyl-2-methoxyphenyl) - 1 - cyclohexyl - 3 - chloro - 1 - propanol (Preparation 4) to react with nortropine hemisuccinate.

EXAMPLE 12

8 - [3 - cyclohexyl - 3 - (2,5 - dimethylphenyl) - 3 - hydroxypropyl] - 3$\alpha$ - benzoyloxynortropane [I; R is $2,5-(CH_3)_2C_6H_3$, R' is $C_5H_{11}$, R" is OH, R''' is $OCOC_6H_5$, Y is $CH_2CH_2$, $n$ is 2] is produced by causing 1-(2,5-dimethylphenyl)-1-cyclohexyl-3-chloro-1-propanol (Preparation 5) to react with nortropine benzoate.

EXAMPLE 13

8 - [3-cyclohexyl-3-(4-ethylphenyl)-3-hydroxypropyl]-3$\alpha$-phenylacetoxynortropane [I; R is $4-C_2H_5C_6H_4$, R' is $C_6H_{11}$, R" is OH, R''' is $OCOCH_2C_6H_5$, Y is $CH_2CH_2$, $n$ is 2] is produced by causing 1-(4-ethylphenyl)-1-cyclohexyl-3-chloro-1-propanol (Preparation 6) to react with nortropine phenylacetate.

EXAMPLE 14

8 - [3-cyclohexyl-3-(4-fluorophenyl)-3-hydroxypropyl]-3$\alpha$-acryloxynortropane [I; R is $4-FC_6H_4$, R' is $C_6H_{11}$, R" is OH, R''' is $OCOCH=CH_2$, Y is $CH_2CH_2$, $n$ is 2] is produced by causing 1-(4-fluorophenyl)-1-cyclohexyl-3-chloro-1-propanol (Preparation 7) to react with nortropine acrylate.

EXAMPLE 15

8 - [3-cyclohexyl-3-(3-isoamoxy-4-methoxyphenyl)-3-hydroxypropyl]-3$\alpha$-cinnamoyloxynortropane [I; R is 3,4-$[(CH_3)_2CHCH_2CH_2O](CH_3O)C_6H_3$, R' is $C_6H_{11}$, R" is OH, R''' is $OCOCH=CHC_6H_5$, Y is $CH_2CH_2$, $n$ is 2] is produced by causing 1-(3-isoamoxy-4-methoxyphenyl)-1-cyclohexyl-3-bromo-1-propanol (Preparation 8) to react with nortropine cinnamate.

EXAMPLE 16

8 - [3-cyclohexyl-3-(4-chlorophenyl)-3-hydroxypropyl]-3$\alpha$-dimethylcarbamyloxynortropane [I; R is $4-ClC_6H_4$, R' is $C_6H_{11}$, R" is OH, R''' is $OCON(CH_3)_2$, Y is $CH_2CH_2$, $n$ is 2] is produced by causing 1-(4-chlorophenyl)-1-cyclohexyl-3-chloro-1-propanol (Preparation 9) to react with nortropine dimethylcarbamate.

EXAMPLE 17

8 - [3-cyclohexyl-3-(2,5-dimethylphenyl)-3-hydroxy-1-methylpropyl]nortropane [I; R is $2,5-(CH_3)_2C_6H_3$, R' is $C_6H_{11}$, R" is OH, R''' is H, Y is $CH_2CH(CH_3)$, $n$ is 2] is produced by causing 1-(2,5-dimethylphenyl)-1-cyclohexyl-3-chloro-1-butanol (Preparation 10) to react with nortropane.

EXAMPLE 18

8 - (3 - cyclopentyl-3-phenyl-3-hydroxypropyl)nortropane [I; R is $C_6H_5$, R' is $C_5H_9$, R" is OH, R''' is H, Y is $CH_2CH_2$, $n$ is 2] is produced by causing 1-phenyl-1-cyclopentyl-3-chloro-1-propanol (Preparation 11) to react with nortropane.

EXAMPLE 19

8 - [3 - (4-methylcyclohexyl)-3-phenyl-3-hydroxypropyl]nortropane [I; R is $C_6H_5$, R' is $4-CH_3C_6H_{10}$, R" is OH, R''' is H, Y is $CH_2CH_2$, $n$ is 2] is produced by causing 1-phenyl-1-(4-methylcyclohexyl)-3-chloro-1-propanol (Preparation 12) to react with nortropane.

EXAMPLE 20

8 - (3,3-diphenyl-3-hydroxypropyl)nortropane [I; R and R' are $C_6H_5$, R" is OH, R''' is H, Y is $CH_2CH_2$, $n$ is 2] is produced by causing 1,1-diphenyl-3-chloro-1-propanol (Preparation 13) to react with nortropane.

EXAMPLE 21

8 - [3-(4-methoxyphenyl)-3-phenyl-3-hydroxypropyl]nortropane [I; R is $C_6H_5$, R' is $4-CH_3OC_6H_4$, R" is OH, R''' is H, Y is $CH_2CH_2$, $n$ is 2] is produced by causing 1-phenyl-1-(4-methoxyphenyl)-3-chloro-1-propanol (Preparation 14) to react with nortropane.

EXAMPLE 22

8-(3-benzyl-3-phenyl - 3 - hydroxypropyl)nortropane [I; R is $C_6H_5$, R' is $C_6H_5CH_2$, R" is OH, R''' is H, Y is $CH_2CH_2$, $n$ is 2] is produced by causing 1-phenyl-1-benzyl-3-chloro-1-propanol (Preparation 15) to react with nortropane.

EXAMPLE 23

8 - (3-ethyl-3-phenyl-3-hydroxypropyl)nortropane [I; R is $C_6H_5$, R' is $C_2H_5$, R" is OH, R''' is H, Y is $CH_2CH_2$, $n$ is 2] is produced by causing 1-phenyl-1-ethyl-3-chloro-1-propanol (Preparation 16) to react with nortropane.

EXAMPLE 24

8 - [3-(n-hexyl)-3-phenyl-3-hydroxypropyl]nortropane [I; R is $C_6H_5$, R' is $C_6H_{13}$, R" is OH, R''' is H, Y is $CH_2CH_2$, $n$ is 2] is produced by causing 1-phenyl-1-(n-hexyl)-3-chloro-1-propanol (Preparation 17) to react with nortropane.

EXAMPLE 25

8 -[ 3 - (2-thienyl)-3-phenyl-3-hydroxypropyl]nortropane [I; R is $C_6H_5$, R' is $(2)-C_4H_3S$, R" is OH, R''' is H, Y is $CH_2CH_2$, $n$ is 2] is produced by causing 1-phenyl-1-(2-thienyl)-3-chloro-1-propanol (Preparation 18) to react with nortropane.

EXAMPLE 26

8 - [3 - (2-pyridyl)-3-phenyl-3-hydroxypropyl]nortropane [I; R is $C_6H_5$, R' is $(2)-C_5H_4N$, R" is OH, R''' is H, Y is $CH_2CH_2$, $n$ is 2] is produced by causing 1-phenyl-1-(2-pyridyl)-3-chloro-1-propanol (Preparation 19) to react with nortropane.

8 - (3-cyclohexyl-3-phenyl-3-hydroxypropyl)-3$\alpha$-methoxynortropane [I; R is $C_6H_5$, R' is $C_6H_{11}$, R" is OH, R''' is $OCH_3(\alpha)$, Y is $CH_2CH_2$, $n$ is 2] is produced by causing 1-phenyl-1-cyclohexyl-3-chloro-1-propanol (Preparation 1) to react with 3-methoxynortropane (from the sodio derivative of nortropine and methyl iodide).

EXAMPLE 27

8 - (3,3-diphenyl-3-hydroxypropyl)nortropidine [II; R and R' are $C_6H_5$, R" is OH, Y is $CH_2CH_2$, $n$ is 2]: A Grignard reagent was prepared from 4.86 g. (0.20 g. atom) of magnesium turnings and 33.0 g. (0.21 mole) of bromo-benzene, using a few crystals of iodine to initiate the reaction. There was then added in portions 13.9 g. (0.05 mole) of 8-(2-benzoylethyl)nortropidine (Preparation 20) to the stirred Grignard solution at below 0° C. at such a rate that the temperature of the reaction mixture did not exceed 10° C. Toluene (200 ml.) was added, and the reaction mixture was refluxed for one hour and then poured into a mixture of 700 ml. of cracked ice and 50 g. of ammonium chloride. The organic layer was separated, washed with 10% ammonium chloride solution and water, and dried over anhydrous calcium sulfate and potassium carbonate. The solution was concentrated, and the residue dissolved in hexane and extracted with water, twice with 5% ethanesulfonic acid solution and twice with water. The combined aqueous acidic extracts were filtered and made basic with potassium carbonate. The free base was extracted with methylene dichloride, and the solution was dried and concentrated. The residue was dissolved in ether and 2.2 g. of acetic acid was added, whereupon there separated 8.8 g. of 8-(3,3-diphenyl-3-hydroxypropyl)nortropidine in the form of its acetate salt, M.P. 103.0–105.6° C. (corr.), when recrystallized from an ethyl acetate-pentane mixture.

In the foregoing preparation the toluene can be replaced by ether and the reaction mixture refluxed for three hours. This modification was used generally in the preparations described hereinbelow.

8 - (3,3-diphenyl-3-hydroxypropyl)nortropidine in the form of its acetate salt was found to have a mydriatic $ED_{50}$ value of 10.6 mg./kg., and a tremorine normalizing dose of 5.3 mg./kg.

The methiodide salt of 8-(3,3-diphenyl-3-hydroxypropyl)nortropidine had the M.P. 237.0–241.0° C. (corr.) when recrystallized first from an ethanol-ether mixture and then from a methanol-ether mixture.

EXAMPLE 28

8-[3-phenyl - 3 - (2-thienyl) - 3 - hydroxypropyl]nortropidine [II; R is $C_6H_5$, R' is (2)-$C_4H_3S$, R" is OH, Y is $CH_2CH_2$, $n$ is 2] was prepared from 8-(2-benzoylethyl)nortropidine (Preparation 20) and 2-thiophenemagnesium bromide, and obtained in the form of its methanesulfonate salt, M.P. 119.8–141.6° C. (corr.), when recrystallized from acetone.

8-[3-phenyl - 3 - (2-thienyl) - 3 - hydroxypropyl]nortropidine in the form of its methanesulonate salt was found to have a mydriatic $ED_{50}$ value of 4.3 mg./kg., and a tremorine normalizing dose of 2.8 mg./kg.

EXAMPLE 29

8-[3-phenyl - 3 - (2-pyridyl) - 3 - hydroxypropyl]nortropidine [II; R is $C_6H_5$, R' is (2)-$C_5H_4N$, R" is OH, Y is $CH_2CH_2$, $n$ is 2]: A solution of 48.0 g. (0.35 mole) of n-butyl bromide in 150 ml. of ether was added to a suspension of 4.9 g. (0.70 g. atom) of lithium wire in ether at —5- —15° C. The mixture was stirred for two and one-half hours, cooled to —40° C., and 50.0 g. (0.31 mole) of 2-bromopyridine in 150 ml. of ether was added over a period of one-half hour. The mixture was stirred at about —40° C. for ten minutes, and there was then added 22.2 g. (0.08 mole) of 8-(2-benzoylethyl) nortropidine (Preparation 20) in portions during ten minutes. The reaction mixture was allowed to warm to —15° C. and was stirred for one hour. The cooling bath was then removed and the mixture stirred for one hour longer. The reaction mixture was worked up as described above in Example 27. The product was isolated in the form of the free base and was distilled at 93–120° C. (3–4$\mu$) to give 12.9 g. of 8-[3-phenyl-3-(2-pyridyl)-3-hydroxypropyl]nortropidine which crystallized from hexane and had the M.P. 82.4–83.6° C. (corr.).

8-[3-phenyl - 3 - (2-pyridyl) - 3 - hydroxypropyl]nortropidine in the form of its hydrochloride salt was found to have a mydriatic $ED_{50}$ value of 9.1 mg./kg., and a tremorine normalizing dose of 15 mg./kg.

EXAMPLE 30

8 - [3-cyclohexyl-3-(3-bromophenyl)-3-hydroxypropyl] nortropidine [II; R is 3-$BrC_6H_4$, R' is $C_6H_{11}$, R" is OH, Y is $CH_2CH_2$, $n$ is 2] was prepared from 8-[2-(3-bromobenzoyl)ethyl]nortropidine (Preparation 27) and cyclohexylmagnesium bromide, and obtained in the form of its hydrochloride salt, M.P. 256.2–258.4° C. (corr.), when recrystallized from an isopropyl alcohol-ether mixture.

EXAMPLE 31

8-[3-(4-chlorobenzyl) - 3 - phenyl - 3 - hydroxypropyl] nortropidine [II; R is $C_6H_5$, R' is 4-$ClC_6H_4CH_2$, R" is OH, Y is $CH_2CH_2$, $n$ is 2] was prepared from 8-(2-benzoylethyl)nortropidine (Preparation 20) and 4-chlorobenzylmagnesium chloride, and had the M.P. 93–96.2° C. (corr.) when recrystallized from hexane and from a hexane-pentane mixture.

EXAMPLE 32

8-[3-cyclohexyl - 3 - (4-chlorophenyl) - 3 - hydroxypropyl]nortropidine [II; R is 4-$ClC_6H_4$, R' is $C_6H_{11}$, R" is OH, Y is $CH_2CH_2$, $n$ is 2] was prepared from 8-[2-(4-chlorobenzoyl)ethyl]nortropidine (Preparation 28) and cyclohexylmagnesium bromide, and had the M.P. 121.2–122° C. (corr.) when recrystallized from methanol.

EXAMPLE 33

8-[4-(4-chlorobenzyl) - 3 - (4-methoxyphenyl) - 3 - hydroxypropyl]nortropidine [II; R is 4-$CH_3OC_6H_4$, R' is 4-$ClC_6H_4CH_2$, R" is OH, Y is $CH_2CH_2$, $n$ is 2] was prepared from 8-[2-(4-methoxybenzoyl)ethyl]nortropidine (Preparation 29) and 4-chlorobenzylmagnesium chloride, and obtained in the form of its hydrochloride salt, M.P. 237.8–238.6° C. (dec.) (corr.), when recrystallized from a methanol-acetone-ether mixture.

EXAMPLE 34

8-[3-(4-chlorophenyl) - 3 - (4-methoxyphenyl)-3-hydroxypropyl]nortropidine [II; R is 4-$CH_3OC_6H_4$, R' is 4-$ClC_6H_4$, R" is OH, Y is $CH_2CH_2$, $n$ is 2] was prepared from 8-[2-(4-methoxybenzoyl)ethyl]nortropidine (Preparation 29) and 4-chlorophenylmagnesium bromide, and obtained in the form of its hydrochloride salt, M.P. 238.8–239.6° C. (dec.) (corr.), when recrystallized from acetone, from a methanol-acetone-ether mixture, and from ethanol.

EXAMPLE 35

8-[3-(3,4-dichlorobenzyl) - 3 - (4-methoxyphenyl)-3-hydroxypropyl]nortropidine [II; R is 4-$CH_3OC_6H_4$, R' is 3,4-$Cl_2C_6H_3CH_2$, R" is OH, Y is $CH_2CH_2$, $n$ is 2] was prepared from 8-[2-(4-methoxybenzoyl)ethyl]nortropidine (Preparation 29) and 3,4-dichlorobenzylmagnesium chloride, and obtained in the form of its hydrochloride salt, M.P. 253–254° C. (uncorr.), when recrystallized from a methanol-ether mixture. A sample of the hydrochloride salt was converted to the free base form with ammonium hydroxide and recrystallized from hexane to give a sample of 8-[3-(3,4-dichlorobenzyl)-3-(4-methoxyphenyl)-3-hydroxypropyl]nortropidine, M.P. 102–103° C. (uncorr.).

EXAMPLE 36

8-[3-phenyl-3-(4-methoxyphenyl) - 3 - hydroxypropyl] nortropidine [II; R is 4-$CH_3OC_6H_4$, R' is $C_6H_5$, R" is OH, Y is $CH_2CH_2$, $n$ is 2] was prepared from 8-[2-(4-methoxybenzoyl)ethyl]nortropidine (Preparation 29) and phenylmagnesium bromide, and obtained in the form of its hydrochloride salt, M.P. 237° C. (dec.) (corr.), when recrystallized from an aqueous ethanol.

EXAMPLE 37

8-[3-(2-thienyl) - 3 - (4-methoxyphenyl) - 3 - hydroxypropyl]nortropidine [II; R is 4-$CH_3OC_6H_4$, R' is (2)-$C_4H_3S$, R" is OH, Y is $CH_2CH_2$, n is 2] was prepared from 8-[2-(4-methoxybenzoyl)ethyl]nortropidine (Preparation 29) and 2-thiophenemagnesium bromide, and obtained in the form of its hydrochloride salt, M.P. 156–158° C. (uncorr.), when recrystallized from acetone and from ethyl acetate.

EXAMPLE 38

8-[3-cyclohexyl - 3 - (4-methoxyphenyl) - 3 - hydroxypropyl]nortropidine [II; R is 4-$CH_3OC_6H_4$, R' is $C_6H_{11}$, R" is OH, Y is $CH_2CH_2$, n is 2] was prepared from 8-[2-(4-methoxybenzoyl)ethyl]nortropidine (Preparation 29) and cyclohexylmagnesium chloride, and obtained in the form of its hydrochloride salt, M.P. 255.2–256.0° C. (dec.) (corr.), when recrystallized from isopropyl alcohol and an isopropyl alcohol-ether mixture.

EXAMPLE 39

8-[3-(4-chlorophenyl) - 3 - phenyl - 3 - hydroxypropyl]nortropidine [II; R is $C_6H_5$, R' is 4-$ClC_6H_4$, R" is OH, Y is $CH_2CH_2$, n is 2] was prepared from 8-(2-benzoylethyl)nortropidine (Preparation 20) and 4-chlorophenylmagnesium bromide, and obtained in the form of its hydrochloride salt, M.P. 269.6–270.4° C. (corr.), when recrystallized from ethanol and ethanol containing a small amount of water.

EXAMPLE 40

8-[3-(3,4-dichlorobenzyl)-3-phenyl-3 - hydroxypropyl]nortropidine [II; R is $C_6H_5$, R' is 3,4-$Cl_2C_6H_4CH_2$, R" is OH, Y is $CH_2CH_2$, n is 2] was prepared from 8-(2-benzoylethyl)nortropidine (Preparation 20) and 3,4-dichlorobenzylmagnesium chloride, and obtained in the form of its hydrochloride salt, M.P. 240–248° C. (uncorr.). A sample of the hydrochloride salt was converted to the free base form with ammonium hydroxide and recrystallized from methanol to give a sample having the M.P. 71.4–73.0° C. (corr.).

EXAMPLE 41

8-[3-(4-chlorophenyl)-3-(4 - methoxyphenyl) - 3 - hydroxypropyl]nortropane [I; R is 4-$CH_3OC_6H_4$, R' is 4-$ClC_6H_4$, R" is OH, R''' is H, Y is $CH_2CH_2$, n is 2] was prepared from 8-[2-(4-methoxybenzoyl)-ethyl]nortropane (Preparation 33) and 4-chlorophenylmagnesium bromide, and obtained in the form of its hydrochloride salt, M.P. 251.6–252.8° C. (dec.) (corr.), when recrystallized from isopropyl alcohol and from ethanol.

EXAMPLE 42

8-[3-cyclohexyl-3-(4 - methoxyphenyl) - 3 - hydroxypropyl]nortropane [I; R is 4-$CH_3OC_6H_4$, R' is $C_6H_{11}$, R" is OH, R''' is H, Y is $CH_2CH_2$, n is 2] was prepared from 8-[2-(4-methoxybenzoyl)ethyl] nortropane (Preparation 33) and cyclohexylmagnesium chloride, and obtained in the form of its hydrochloride salt, M.P. 254.8–255.6° C. (dec.) (corr.), when recrystallized from acetone and from an ethanol-ether mixture.

EXAMPLE 43

8-[3-(4-chlorophenyl) - 3 - phenyl - 3 - hydroxypropyl]nortropane [I; R is $C_6H_5$, R' is 4-$ClC_6H_4$, R" is OH, R''' is H, Y is $CH_2CH_2$, n is 2]: A mixture of 7.0 g. of 8-[3-(4-chlorophenyl)-3-phenyl-3-hydroxypropyl]nortropidine hydrochloride (Example 39), 0.5 g. of platinum oxide catalyst, 20 ml. of water and 200 ml. of ethanol was hydrogenated at 48° C. and 60 lbs. per sq. inch. The hydrogenation was completed after about seven minutes, and the mixture was filtered and the filtrate concentrated in vacuo. The residue was recrystallized from methanol to give 5.32 g. of 8-[3-(4-chlorophenyl)-3-phenyl-3-hydroxypropyl]nortropane in the form of its hydrochloride salt, M.P. 288.0–288.6° C. (corr.).

EXAMPLE 44

8-[3-(3,4-dichlorobenzyl)-3-phenyl-3 - hydroxypropyl] nortropane [I; R is $C_6H_5$, R' is 3,4-$Cl_2C_6H_4CH_2$, R" is OH, R''' is H, Y is $CH_2CH_2$, n is 2] was prepared by hydrogenation of 8-[3-(3,4-dichlorobenzyl)-3-phenyl-3-hydroxypropyl]nortropidine hydrochloride (Example 40) according to the manipulative procedure described above in Example 43, and obtained in the form of its hydrochloride salt, M.P. 229.3–232.4° C. (corr.), when recrystallized from a methanol-ether mixture.

EXAMPLE 45

8-(3,3-diphenyl-3-hydroxypropyl)nortropane [I; R and R' are $C_6H_5$, R" is OH, R''' is H, Y is $CH_2CH_2$, n is 2] was prepared from 8-(2-benzoylethyl)nortropane (Preparation 32) and phenylmagnesium bromide, and obtained in the form of its hydrochloride salt, M.P. 268° C. (dec.) (uncorr.). A sample of the hydrochloride salt was converted to the free base and recrystallized from hexane to give a sample of 8-(3,3-diphenyl-3-hydroxypropyl)nortropane, M.P. 94.0–95.2° C. (corr.).

EXAMPLE 46

8-[3-(2-thienyl)-3-phenyl - 3 - hydroxypropyl]nortropane [I; R is $C_6H_5$, R' is (2)-$C_4H_3S$, R" is OH, R''' is H, Y is $CH_2CH_2$, n is 2] was prepared from 8-(2-benzoylethyl)nortropane (Preparation 32) and 2-thiophenemagnesium bromide, and obtained in the form of its hydrochloride salt, M.P. 239.2–240.0° C. (corr.), when recrystallized from methanol.

8-[3-(2-thienyl)-3-phenyl - 3 - hydroxypropyl]nortropane is the form of its hydrochloride salt was found to have a mydriatic $ED_{50}$ value of 8.1 mg./kg., and a tremorine normalizing dose of 5.7 mg./kg.

EXAMPLE 47

8-[3-cyclohexyl-3-(3,4-dichlorophenyl) - 3 - hydroxypropyl]nortropidine [I; R is 3,4-$Cl_2C_6H_4$, R' is $C_6H_{11}$, R" is OH, R''' is H, Y is $CH_2CH_2$, n is 2] was prepared from 8-[2-(3,4-dichlorobenzoyl)ethyl]nortropidine (Preparation 30) and cyclohexylmagnesium chloride, and obtained in the form of its hydrochloride salt, M.P. 282–284° C. (uncorr.), when recrystallized from a methanol-ether mixture.

EXAMPLE 48

8-[3-(3,4-dimethoxyphenyl) - 3 - phenyl - 3 - hydroxypropyl]nortropine [I; R is $C_6H_5$, R' is 3,4-$(CH_3O)_2C_6H_3$, R" and R''' are OH, Y is $CH_2CH_2$, n is 2] is produced by causing 8-(2-benzoylethyl)nortropine (Preparation 21) to react with 3,4-dimethoxyphenylmagnesium bromide according to the manipulative procedure described above in Example 27.

EXAMPLE 49

9-[3-(p-tolyl)-3-phenyl-3 - hydroxypropyl]granatanine [I; R is $C_6H_5$, R' is 4-$CH_3C_6H_4$, R" is OH, R''' is H, Y is $CH_2CH_2$, n is 3] is produced by causing 9-(2-benzoylethyl)granatanine (Preparation 22) to react with p-tolylmagnesium bromide.

EXAMPLE 50

8-[3(-cyclopentyl-3-(4-methoxyphenyl) - 3 - hydroxypropyl]nortropidine [II; R is 4-$CH_3OC_6H_4$, R' is $C_5H_9$, R" is OH, Y is $CH_2CH_2$, n is 2] is produced by causing 8-[2-(4-methoxybenzoyl)ethyl]nortropidine (Preparation 23) to react with cyclopentylmagnesium bromide.

EXAMPLE 51

8-[3-(4-methylcyclohexyl)-3-(p - tolyl) - 3 - hydroxypropyl]nortropidine [II; R is 4-$CH_3C_6H_4$, R' is

4-$CH_3C_6H_{10}$

R" is OH, Y is $CH_2CH_2$, n is 2] is produced by causing 8-[2-(4-methylbenzoyl)ethyl]nortropidine (Preparation 24) to react with 4-methylcyclohexylmagnesium bromide.

EXAMPLE 52

8-[3-ethyl-3-(4-fluorophenyl) - 3 - hydroxypropyl]nortropidine [II; R is 4-$FC_6H_4$, R' is $C_2H_5$, R" is OH, Y is CH₂CH₂, n is 2] is produced by causing 8-[2-(4-fluorobenzoyl)ethyl]nortropidine (Preparation 25) to react with ethylmagnesium bromide.

EXAMPLE 53

8-[3-isopropyl-3-(3,5-dimethylphenyl)-1-methyl-3 - hydroxypropyl]-nortropidine [II; R is 3,5-(CH₃)₂C₆H₃, R' is (CH₃)₂CH, R" is OH, Y is CH₂CH(CH₃), n is 2] is produced by causing 8-[2-(3,5-dimethylbenzoyl)-1-methylethyl]nortropidine (Preparation 26) to react with isopropylmagnesium bromide.

EXAMPLE 54

8[3-cyclohexyl-3-(3,4 - dichlorophenyl) - 3 - hydroxypropyl]nortropidine [II; R is 3,4-Cl₂C₆H₃, R' is C₆H₁₁, R" is OH, Y is CH₂CH₂, n is 2] was prepared from 8-[2-(3,4-dichlorobenzoyl) ethyl]nortropidine (Preparation 30) and cyclohexylmagnesium bromide, and obtained in the form of its hydrochloride salt, M.P. 284–285° C. (uncorr.), when recrystallized from isopropyl alcohol.

EXAMPLE 55

8-[3-(2-phenylethyl)-3-(3-nitrophenyl) - 3 - hydroxypropyl]nortropidine [II; R is 3-(O₂N)C₆H₄, R' is

C₆H₅CH₂CH₂

R" is OH, Y is CH₂CH₂, n is 2] is produced by causing 8-[2-(3-nitrobenzoyl)ethyl]nortropidine (Preparation 31) to react with 2-phenylethylmagnesium bromide.

EXAMPLE 56

8 - [3 - (3 - thienyl)-3-(3-bromophenyl)-3-hyroxypropyl]nortropane [I; R is 3-BrC₆H₄, R' is (3)-C₄H₃S, R" is OH, R'" is H, Y is CH₂CH₂, n is 2] is produced by causing 8 - [2-(3-bromobenzoyl)-ethyl]nortropane (Preparation 34) to react with 3-thienylmagnesium bromide.

EXAMPLE 57

9 - [3 - (4-pyridyl) - 3 - (3-bromophenyl)-3-hydroxypropyl]granatanine [I; R is 3-BrC₆H₄, R' is (4)-C₅H₄N, R" is OH, R'" is H, Y is CH₂CH₂, n is 3] is produced by causing 9-[2-(3-bromobenzoyl)-ethyl]granatanine (Preparation 35) to react with 4-pyridyl-lithium according to the manipulative procedure described above in Example 29.

EXAMPLE 58

9 - [3 - cyclohexyl - 3 - (3-bromophenyl)-3-hydroxypropyl] - 3 - hydroxy granatanine [I; R is 3-BrC₆H₄, R' is C₆H₁₁, R" and R'" are OH, Y is CH₂CH₂, n is 3] is produced by causing 9-[2-(3-bromobenzoyl)ethyl]-3β-hydroxygranatanine (Preparation 36) to react with cyclohexylmagnesium bromide according to the manipulative procedure described above in Example 27.

EXAMPLE 59

9 - [3 - cyclohexyl - 3 - (3-bromophenyl)3-hydroxypropyl]-Δ²-granatenine [II; R is 3-BrC₆H₄, R' is C₆H₁₁, R" is OH, Y is CH₂CH₂, n is 3] is produced by causing 9 - [2 - (3 - bromobenzoyl)ethyl]-Δ²-granatenine (Preparation 37) to react with cyclohexylmagnesium bromide.

EXAMPLE 60

8 - [3 - cyclohexyl - 3 - (p-tolyl) - 3 - hydroxypropyl]-nortropidine [II; R is 4-CH₃C₆H₄, R' is C₆H₁₁, R" is OH, Y is CH₂CH₂, n is 2] is produced by causing 8-[2-(4-methylbenzoyl)ethyl]nortropidine (Preparation 38) to react with cyclohexyl magnesium bromide.

EXAMPLE 61

8 - [3 - cyclohexyl - 3 - (3-bromo-4-chlorophenyl)-3-hydroxypropyl]nortropidine [II; R is 3,4-BrClC₆H₃, R' is C₆H₁₁, R" is OH, Y is CH₂CH₂, n is 2] is produced by causing 8-[2-(3-bromo-4-chlorobenzoyl)ethyl]nortropidine (Preparation 39) to react with cyclohexylmagnesium bromide.

EXAMPLE 62

8 - [3 - cyclohexyl - 3-(2-bromo-3,4-dimethoxyphenyl)-3 - hydroxypropyl] - nortropidine [II; R is 2,3,4-Br-(CH₃O)₂C₆H₂, R' is C₆H₁₁, R" is OH, Y is CH₂CH₂, n is 2] is produced by causing 8-[2-(2-bromo-3,4-dimethoxybenzoyl)ethyl]nortropidine (Preparation 40) to react with cyclohexylmagnesium bromide.

EXAMPLE 63

8 - [3 - cyclohexyl - 3 - (4 - secondary-butylphenyl)-3-hydroxypropyl]nortropidine [II; R is

4-[CH₃CH₂CH(CH₃)]C₆H₄

R' is C₆H₁₁, R" is OH, Y is CH₂CH₂, n is 2] is produced by causing 8 - [2-(4-secondary-butylbenzoyl)ethyl]nortropidine (Preparation 41) to react with cyclohexylmagnesium bromide.

EXAMPLE 64

8 - [3 - cyclohexyl - 3 - (4-n-hexylphenyl)-3-hydroxypropyl]nortropidine [II; R is 4-(C₆H₁₃)C₆H₄, R' is C₆H₁₁, R" is OH, Y is CH₂CH₂, n is 2] is produced by causing 8-[2-(4-n-nhexylbenzoyl)ethyl]nortropidine (Preparation 42) to react with cyclohexylmagnesium bromide.

EXAMPLE 65

8 - [3 - cyclohexyl - 3 - (2,4,6 - trimethylphenyl)ethyl]nortropidine [II; R is 2,4,6-(CH₃)₃C₆H₂, R' is C₆H₁₁, R" is OH, Y is CH₂CH₂, n is 2] is produced by causing 8 - [2-(2,4,6-trimethylbenzoyl]ethyl]nortropidine (Preparation 43) to react with cyclohexylmagnesium bromide.

EXAMPLE 66

8 - [3 - cyclohexyl - 3 - (2,4,6-trimethoxyphenyl)-3-hydroxypropyl]nortropidine [II; R is 2,4,6-(CH₃O)₃C₆H₂, R' is C₆H₁₁, R" is OH, Y is CH₂CH₂, n is 2] is produced by causing 8-[2-(2,4,6-trimethoxybenzoyl)ethyl]nortropidine (Preparation 44) to react with cyclohexylmagnesium bromide.

8-[3 - (2-furyl)-3-phenyl-3-hydroxypropyl]nortropane [I; R is C₆H₅, R' is (2)-C₄H₃O, R" is OH, R'" is H, Y is CH₂CH₂, n is 2] is produced by causing 8-[2-(2-furoyl)ethyl]nortropane to react with phenylmagnesium bromide.

8 - [3 - (3 - indolyl)-3-phenyl-3-hydroxypropyl]nortropane [I; R is C₆H₅, R' is (3)-indolyl, R" is OH, R'" is H, Y is CH₂CH₂, n is 2] is produced by causing 8-[3-(3-indolyl)-3-oxopropyl]nortropane to react with phenylmagnesium bromide.

EXAMPLE 67

8 - (3,3 - diphenyl-2-propenyl)nortropidine [IX; R and R' are C₆H₅, n is 2]: A solution of 3.0 g. of 8-(3,3-diphenyl-3-hydroxypropyl)nortropidine (Example 27) in 20 ml. of glacial acetic acid and 6 ml. of concentrated hydrochloric acid was refluxed for thirty minutes. The reaction mixture was concentrated and the residue dissolved in water and made basic with excess ammonium hydroxide. The product was extracted with methylene dichloride, and the extracts were dried over anhydrous calcium sulfate, filtered and concentrated in vacuo. The residue was dissolved in ether, the solution filtered, and an excess of ethereal hydrogen chloride was added to the filtrate. There was thus obtained 1.7 g. of 8-(3,3-diphenyl-2-propenyl)nortropidine in the form of its hydrochloride salt, M.P. 195.2–196.2° C. (corr.), when recrystallized from an isopropyl alcohol-ether mixture and from acetone.

8 - (3,3-diphenyl - 2 - propenyl)nortropidine in the form of its hydrochloride salt was found to have a mydriatic ED₅₀ value of 17 mg./kg., and a tremorine normalizing dose of 29 mg./kg.

EXAMPLE 68

8 - [3 - phenyl - 3-(2-thienyl)-2-propenyl]nortropidine [IX; R is C₆H₅, R' is (2)-C₄H₃S, n is 2] is produced by dehydration of 8 - [3 - phenyl - 3 - (2 - thienyl)-3- hydroxypropyl]nortropidine (Example 28) according to the manipulative procedure described above in Example 67.

EXAMPLE 69

8 - [3-phenyl-3-(2-pyridyl) - 2 - propenyl]nortropidine [IX; R is C₆H₅, R' is (2)-C₅H₄N, n is 2] is produced by dehydration of 8-[3 - phenyl - 3 - (2-pyridyl)-3-hydroxypropyl]nortropidine (Example 29).

EXAMPLE 70

8 - [3 - (4 - chlorophenyl) - 3 - (4-methoxyphenyl)-2-propenyl]nortropidine [IX; R is 4-$CH_3OC_6H_4$, R' is 4-$ClC_6H_4$, $n$ is 2] is produced by dehydration of 8-[3-(4-chlorophenyl) - 3 - (4 - methoxyphenyl) - 3 - hydroxypropyl]nortropidine (Example 34).

EXAMPLE 71

8 - [3 - (4 - chlorophenyl) - 3 - phenyl-2-propenyl]nortropidine (IX; R is $C_6H_5$, R' is 4-$ClC_6H_4$, $n$ is 2] is produced by dehydration of 8 - [3-(4-chlorophenyl)-3-phenyl - 3 - hydroxypropyl]nortropidine.

EXAMPLE 72

8-[3-(4-chlorophenyl)-3-(4-methoxyphenyl) - 2-propenyl]nortropane [VIII; R is 4-$CH_3OC_6H_4$, R' is 4-$ClC_6H_4$, R''' is H, $n$ is 2] is produced by dehydration of 8-[3-(4-chlorophenyl)-3-(4-methoxyphenyl) - 3 - hydroxypropyl] nortropane (Example 41).

EXAMPLE 73

8-[3-(4-chlorophenyl)-3-phenyl - 2 - propenyl]nortropane [VIII; R is $C_6H_5$, R' is 4-$ClC_6H_4$, R''' is H, $n$ is 2] is produced by dehydration of 8-[3-(4-chlorophenyl)-3-phenyl-3-hydroxypropyl]nortropane (Example 43).

EXAMPLE 74

8-[3-(2-thienyl)-3-phenyl-3-propenyl]nortropane [VIII; R is $C_6H_5$, R' is (2)-$C_4H_3S$, R''' is H, $n$ is 2] is produced by dehydration of 8-[3-(2-thienyl)-3-phenyl-3-hydroxypropyl]nortropane (Example 46).

EXAMPLE 75

8-(3,3-diphenyl-2-propenyl)nortropane [VIII; R and R' are $C_6H_5$, R''' is H, $n$ is 2] was prepared by dehydration of 8-(3,3-diphenyl-3-hydroxypropyl)nortropane (Example 45) with concentrated hydrochloric acid in glacial acetic acid according to the manipulative procedure described above in Example 67, and obtained in the form of its hydrochloride salt, M.P. 206–208.8° C. (corr.), when recrystallized first from a methanol-acetone-ether mixture and then several times from acetone.

EXAMPLE 76

8-(3,3-diphenylpropyl)nortropane [I; R and R' are $C_6H_5$, R'' and R''' are H, Y is $CH_2CH_2$, $n$ is 2]: A solution of 3.3 g. of 8-(3,3-diphenyl-2-propenyl)nortropane hydrochloride (Example 75) in 200 ml. of ethanol was hydrogenated in the presence of 0.2 g. of platinum oxide catalyst. The reaction mixture was filtered, the filtrate concentrated in vacuo and the residue recrystallized first from acetone and then from isopropyl alcohol to give 8-(3,3-diphenylpropyl)nortropane in the form of its hydrochloride salt, M.P. 279.2–280.8° C. (corr.).

8-(3,3-diphenylpropyl)nortropane can also be obtained by hydrogenation of 8-(3,3-diphenyl-2-propenyl)nortropidine (Example 67) or by condensation of 3,3-diphenylpropyl chloride with nortropane according to the manipulative procedure described above in Example 1.

EXAMPLE 77

8-[3-phenyl-3-(2-pyridyl)propyl]nortropane [I; R is $C_6H_5$, R' is (2)-$C_5H_4N$, R'' and R''' are H, Y is $CH_2CH_2$, $n$ is 2] is produced by hydrogenation of 8-[3-phenyl-3-(2-pyridyl)-2-propenyl]nortropidine (Example 69) according to the manipulative procedure described above in Example 76.

EXAMPLE 78

8-[3-(4-chlorophenyl) - 3 - (4-methoxyphenyl)propyl] nortropane [I; R is 4-$CH_3OC_6H_4$, R' is 4-$ClC_6H_4$, R'' and R''' are H, Y is $CH_2CH_2$, $n$ is 2] is produced by hydrogenation of 8-[3-(4-chlorophenyl)-3-(4-methoxyphenyl)-2-propenyl]nortropidine (Example 70) or 8-[3-(4-chlorophenyl)-3-(4-methoxyphenyl) - 2-propenyl]nortropane (Example 72).

EXAMPLE 79

8-[3-(4-chlorophenyl)-3 - phenylpropyl]nortropane [I; R is $C_6H_5$, R' is 4-$ClC_6H_4$, R'' and R''' are H, Y is $CH_2CH_2$, $n$ is 2] is produced by hydrogenation of 8-[3-(4-chlorophenyl)-3-phenyl-2-propenyl]nortropidine (Example 71).

EXAMPLE 80

8-[3-(2-thienyl) - 3 - phenylpropyl]nortropane [I; R is $C_6H_5$, R' is (2)-$C_4H_3S$, R'' and R''' are H, Y is $CH_2CH_2$, $n$ is 2] is produced by hydrogenation of 8-[3-(2-thienyl)-3-phenyl-3-propenyl]nortropane (Example 74).

EXAMPLE 81

8-[3-phenyl-3-(2-chlorophenyl)-3 - hydroxypropyl]nortropidine [II; R is 2-$ClC_6H_4$, R' is $C_6H_5$, R'' is OH, Y is $CH_2CH_2$, $n$ is 2] was prepared from 8-[2-(2-chlorobenzoyl)ethyl]nortropidine (Preparation 45) and phenylmagnesium bromide, and obtained in the form of its hydrochloride salt, M.P. 233.2–234.6° C. (corr.), when recrystallized first from acetone and then from an acetone-isopropyl alcohol mixture.

EXAMPLE 82

8-[3-phenyl-(2-chlorophenyl) - 3 - hydroxypropyl)nortropane [I; R is 2-$ClC_6H_4$, R' is $C_6H_5$, R'' is OH, R''' is H, Y is $CH_2CH_2$, $n$ is 2]: A solution of 6.5 g. of 8-[3-phenyl-3-(2-chlorophenyl) - 3 - hydroxypropyl]nortropidine (Example 81) in 200 ml. of ethanol was hydrogenated at room temperature and 58 lbs. per sq. inch in the presence of 0.3 g. of platinum oxide catalyst. The hydrogenation was complete in about fifteen minutes, and the reaction mixture was filtered, the filtrate concentrated in vacuo and the residue recrystallized from acetone to give 4.5 g. of 8-[3-phenyl-(2-chlorophenyl)-3-hydroxypropyl] nortropane in the form of its hydrochloride salt, M.P. 239.0–240.2° C. (corr.).

EXAMPLE 83

8-(3,3-diphenyl-3-hydroxypropyl) - 3α - hydroxynortropane [I; R and R' are $C_6H_5$, R'' and R''' are OH, Y is $CH_2CH_2$, $n$ is 2] was prepared from 8-(2-benzoylethyl) nortropine (Preparation 21) and phenylmagnesium bromide, and had the M.P. 168.8–171.2° C. (corr.) when recrystallized from ethyl acetate.

EXAMPLE 84

8-(3,3-diphenyl-2-propenyl) - 3α - hydroxynortropane [VIII; R and R' are $C_6H_5$, R''' is OH, Y is $CH_2CH_2$, $n$ is 2]: A solution of 7.5 g. of 8-(3,3-diphenyl-3-hydroxypropyl)-3α-hydroxynortropane (Example 83) in 65 ml. of concentrated hydrochloric acid and 15 ml. of water was stirred for one-half hour and kept at room temperature for two days. The reaction mixture was concentrated nearly to dryness at 35° C., diluted with water and again concentrated to remove residual hydrochloric acid. The residue was recrystallized from water, from acetone and finally from an ethanol-benzene-ether mixture to give 8-(3,3-diphenyl-2-propenyl) - 3α - hydroxynortropane in the form of its hydrochloride salt, M.P. 215–217° C. (uncorr.). A sample of the latter was converted to the free base which had the M.P. 108–115° C. (uncorr.) when recrystallized from aqueous methanol. The ultraviolet spectrum in ethanol showed a maximum at 250 m$\mu$ (E=14,800).

EXAMPLE 85

8-(3,3-diphenylpropyl) - 3α - hydroxynortropane [I; R and R' are $C_6H_5$, R'' is H, R''' is OH, Y is $CH_2CH_2$, $n$ is 2]: A mixture of 3.9 g. of 8-(3,3-diphenyl-2-propenyl)-3α-hydroxynortropane (Example 84), 0.5 g. of 10% palladium-on-carbon catalyst and 200 ml. of absolute ethanol was hydrogenated at 26° C. and 60 lbs. per sq. inch. Hydrogenation was complete in forty-five minutes. The reaction mixture was filtered and concentrated to dryness, and the residue recrystallized from an ethanol-benzene-ether mixture to give 8-(3,3-diphenylpropyl)-3α-hydroxy-nortropane, M.P. 199–201° C. (uncorr.).

I claim:

1. A compound selected from the group consisting of (A) a compound having the formula

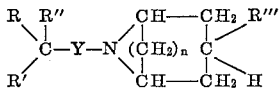

and

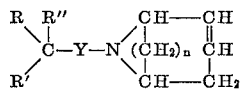

wherein R is monocarbocyclic aryl; R' is a member of the group consisting of monocarbocyclic aryl, cycloalkyl having from 5 to 6 ring members, lower-alkyl, monocarbocyclic aryl-lower-alkyl, thienyl, pyridyl, furyl and indolyl; R'' is a member of the group consisting of hydrogen and hydroxy; R''' is a member of the group consisting of hydrogen, hydroxy, lower-alkoxy, lower-alkanoyloxy, carboxy-lower-alkanoyloxy, monocarbocyclic aroyl, monocarbocyclic aryl-lower-alkanoyl, lower-alkenoyl, monocarbocyclic aryl-lower-alkenoyl, carbamyloxy, N-lower-alkylcarbamyloxy and N,N-di-lower-alkylcarbamyloxy; Y is an α,β-lower-alkylene bridge; and $n$ is an integer from 2 to 3; monocarbocyclic aryl in each instance being a member of the group consisting of phenyl and phenyl substituted by from one to three substituents selected from the group consisting of lower-alkyl, lower-alkoxy, halogen, hydroxy and nitro; (B) acid-addition salts thereof; and (C) quaternary ammonium salts thereof.

2. A compound having the formula

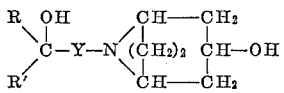

wherein R is phenyl; R' is phenyl; and Y is an α,β-lower-alkylene bridge.

3. A compound having the formula

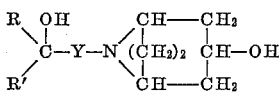

wherein R is phenyl; R' is cycloalkyl having from 5 to 6 ring members; and Y is an α,β-lower-alkylene bridge.

4. A compound having the formula

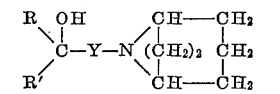

wherein R is phenyl; R' is phenyl; and Y is an α,β-lower-alkylene bridge.

5. A compound having the formula

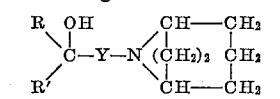

wherein R is phenyl; R' is cycloalkyl having from 5 to 6 ring members; and Y is an α,β-lower-alkylene bridge.

6. A compound having the formula

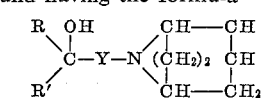

wherein R is phenyl; R' is phenyl; and Y is an α,β-lower-alkylene bridge.

7. A compound having the formula

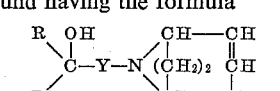

wherein R is phenyl; R' is cycloalkyl having from 5 to 6 ring members; and Y is an α,β-lower-alkylene bridge.

8. 8 - (3-cyclohexyl-3-phenyl-3-hydroxypropyl)nortropane.

9. 8 - (3-cyclohexyl-3-phenyl-3-hydroxypropyl)nortropidine.

10. 8-(3,3-diphenyl-3-hydroxypropyl)nortropidine.

11. 8 - [3-phenyl-3-(2-chlorophenyl)-3-hydroxypropyl]nortropidine.

12. 8 - [3-phenyl-3-(2-chlorophenyl)-3-hydroxypropyl]nortropane.

13. A compound selected from the group consisting of (A) a compound having the formula

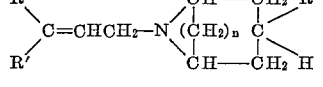

and

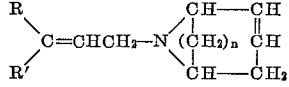

wherein R is monocarbocyclic aryl; R' is a member of the group consisting of monocarbocyclic aryl, thienyl, pyridyl, furyl and indolyl; R''' is a member of the group consisting of hydrogen, hydroxy, lower-alkoxy, lower-alkanoyloxy, carboxy-lower-alkanoyloxy, monocarbocyclic aroyl, monocarbocyclic aryl-lower-alkanoyl, lower-alkenoyl, monocarbocyclic aryl-lower-alkenoyl, carbamyloxy, N-lower-alkylcarbamyloxy and N,N-di-lower-alkylcarbamyloxy; and $n$ is an integer from 2 to 3; monocarbocyclic aryl in each instance being a member of the group consisting of phenyl and phenyl substituted by from one to three substituents selected from the group consisting of lower-alkyl, lower-alkoxy, halogen, hydroxy and nitro; (B) acid-addition salts thereof; and (C) quaternary ammonium salts thereof.

14. A compound having the formula

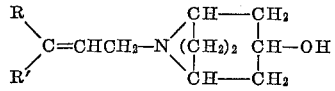

wherein R is phenyl and R' is phenyl.

15. 8-(3,3-diphenyl-2-propenyl)nortropidine.

16. 8-(3,3-diphenyl-2-propenyl)nortropane.

17. A compound selected from the group consisting of (A) a compound having the formula

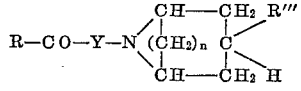

and

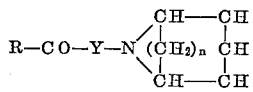

wherein R is a member of the group consisting of phenyl and phenyl substituted by from one to three substituents selected from the group consisting of lower-alkyl, lower-alkoxy, halogen, hydroxy and nitro; R''' is a member of the group consisting of hydrogen and hydroxy; Y is an α,β-lower-alkylene bridge; and $n$ is an integer from 2 to 3.

18. A compound having the formula

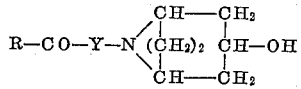

wherein R is phenyl and Y is an α,β-lower-alkylene bridge.

19. A compound having the formula

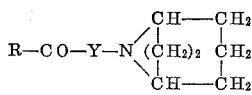

wherein R is phenyl and Y is an α,β-lower-alkylene bridge.

20. A compound having the formula

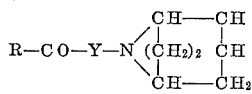

wherein R is phenyl and Y is an α,β-lower-alkylene bridge.

21. 8-(2-benzoylethyl)nortropidine.
22. 8-[2-(4-chlorobenzoyl)ethyl]nortropidine.
23. 8-[2-(4-methoxybenzoyl)ethyl]nortropidine.
24. 8-[2-(3,4-dichlorobenzoyl)ethyl]nortropidine.
25. 8-(2-benzoylethyl)nortropane.
26. A compound of the class consisting of a free base and its acid addition salts, said free base having the formula:

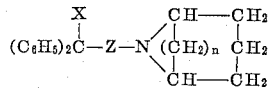

where X is a member of the group consisting of hydrogen and hydroxyl, Z is an α,β-lower-alkylene bridge and $n$ is an integer of 2–3 inclusive.

References Cited by the Examiner

UNITED STATES PATENTS

| | | | |
|---|---|---|---|
| 2,683,716 | 7/1954 | Winsten | 260—240 X |
| 2,695,290 | 11/1954 | Finkelstein et al. | 260—240 |
| 2,800,477 | 7/1957 | Stoll et al. | 260—292 |
| 2,824,106 | 2/1958 | Zeile et al. | 260—292 |
| 2,828,312 | 3/1958 | Johnston et al. | 260—292 |
| 2,833,773 | 5/1958 | Nador et al. | 260—292 |
| 2,834,783 | 5/1958 | Bloom et al. | 260—292 |
| 2,838,441 | 6/1958 | Allen et al. | 260—240 X |
| 2,923,711 | 2/1960 | Zangg et al. | 260—292 |
| 2,962,501 | 11/1960 | Cutler et al. | 260—240 X |
| 3,010,965 | 11/1961 | Elpern | 260—240 X |
| 3,032,556 | 5/1962 | Jucker et al. | 260—292 |

FOREIGN PATENTS 805,859  12/1958  Great Britain.

OTHER REFERENCES

Royals "Advanced Organic Chemistry," Prentice-Hall Publ. Co., 1954, pp. 97–100, 685 and 787–790.

WALTER A. MODANCE, *Primary Examiner.*

DUVAL T. McCUTCHEN, JOHN D. RANDOLPH,
*Examiners.*

MARION W. WESTERN, JOHN M. FORD,
*Assistant Examiners.*

UNITED STATES PATENT OFFICE
CERTIFICATE OF CORRECTION

Patent No. 3,261,841                                            July 19, 1966

Bernard L. Zenitz

It is hereby certified that error appears in the above numbered patent requiring correction and that the said Letters Patent should read as corrected below.

Column 10, line 28, for "2-[2-" read -- 8-[2- --; column 13, line 48, for "$C_5H_{11}$" read -- $C_6H_{11}$ --; column 23, lines 64 to 68, the formula should appear as shown below instead of as in the patent:

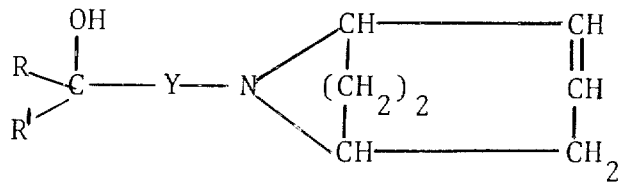

column 24, lines 51 to 60, the second formula should appear as shown below instead of as in the patent:

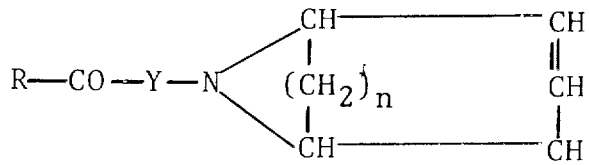

column 25, lines 9 to 12, the formula should appear as shown below instead of as in the patent:

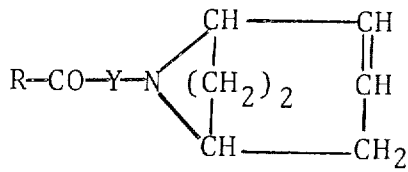

Signed and sealed this 5th day of September 1967.

(SEAL)
Attest:

ERNEST W. SWIDER                              EDWARD J. BRENNER
Attesting Officer                               Commissioner of Patents